United States Patent [19]
Shin

[11] Patent Number: 6,134,266
[45] Date of Patent: Oct. 17, 2000

[54] MODEM SYSTEM WITH VOICE MESSAGE FUNCTION

[75] Inventor: Seong-Kee Shin, Suwon, Rep. of Korea

[73] Assignee: SamSung Electronics Co., Ltd., Suwon, Rep. of Korea

[21] Appl. No.: 08/958,442

[22] Filed: Oct. 27, 1997

[30] Foreign Application Priority Data

Oct. 28, 1996 [KR] Rep. of Korea ...................... 96-49199

[51] Int. Cl.⁷ .................................................. H04B 1/38
[52] U.S. Cl. .............................. 375/222; 379/67; 379/75; 379/88
[58] Field of Search .............................. 375/222; 379/67, 379/75, 88, 202, 100.06

[56] References Cited

U.S. PATENT DOCUMENTS

| | | | |
|---|---|---|---|
| 4,914,687 | 4/1990 | Maeda | 379/88 |
| 5,003,574 | 3/1991 | Denq et al. | 379/75 |
| 5,023,903 | 6/1991 | Bowen | 379/67 |
| 5,412,710 | 5/1995 | Tanaka | 379/67 |

*Primary Examiner*—Stephen Chin
*Assistant Examiner*—Shuwang Liu
*Attorney, Agent, or Firm*—Robert E. Bushnell, Esq.

[57] ABSTRACT

A modem system having a voice message function of generating voices corresponding to a calling tone, an answering tone and a series of handshake operations, in which one modem calls another modem, answers thereto, exchanges parameters and digital data between them and terminates a connection between them. The modem system comprises a modem circuit, and a voice message control apparatus for performing the voice message function. The voice message control apparatus has a detector for detecting the operation state of a modem, a storage section for storing the voice message corresponding to the operation states of the modem, a message output section for outputting a voice message stored in the storage section, and a controller for enabling the message output section to output the voice message according to the operation state of the modem detected by the detector.

15 Claims, 5 Drawing Sheets

MODEM SYSTEM WITH VOICE MESSAGE FUNCTION

CLAIM OF PRIORITY

This application makes reference to, incorporates the same herein, and claims all benefits accruing under 35 U.S.C. §119 from an application entitled A Modem System With Voice Message Function earlier filed in the Korean Industrial Property Office on Oct. 28, 1996, and there duly assigned Serial No. 96-49199 by that Office.

BACKGROUND OF THE INVENTION

1. Field of the Invention

The present invention relates to a modem with a voice message function, and more particularly, to a modem system having a voice message function of generating voices corresponding to a calling tone, an answering tone and a series of handshake operations, in which one modem calls another modem, answers thereto, exchanges parameters and digital data between them and terminates a connection between them, and a control method therefor.

Herein, a modem is a device which can exchange data between computers with a combination modulator and demodulator at each end of a telephone line to convert binary digital information to audio tone signals suitable for transmission over the line, and vice versa.

2. Background of the Invention

Handshaking is generally performed as follows: a user modem (called a source modem below) can be connected to another modem (called a destination modem below) by making a phone call while using a computer keyboard. The destination modem sends an answering signal to the source modem. As the source modem receives the answer signal from the destination modem, communication parameters are exchanged between the source modem and the destination modem. After the exchanging of the communication parameters is finished, communication data is exchanged between the source modem and the destination modem. When the communication data exchanging is completed, if the modem connection is intended to be terminated, the source modem transfers an off-hooking signal to the destination modem to end the modem connection. Then, the destination modem sends a connection terminating signal to the source modem, thereby cutting off the connection between them.

The conventional modem generates machine signaling sounds which are not readily recognized during the process of performing a connection between modems, the signaling of the connection termination, a series of the handshake operation, for example, the parameter exchanging, the data exchange, etc., in which the machine signaling sound is called a modem tone including a calling tone, an answer tone, a handshake, etc. The modem tone is a type of noise which causes an uncomfortable feeling to one listening to these tones being generated. In order to avoid the generation of the noise, users often disable the speaker generation of the modem tone, but in that case the user has a problem in that the operation state of the modem is not recognizable. That is, by listening to the generated tones the user can usually identify when a connection is unsuccessful and can then attempt to place the call again but if the speaker is disabled then such an identifying process is not as easily performed.

In order to resolve these problems and disadvantages, an object of the invention is to provide a modem system having a voice message function of generating voices corresponding to a calling tone, an answering tone and a series of handshakes, which one modem calls another modem, answers thereto, exchanges parameters and digital data between them and termination of the connection between them.

The other object of the invention is to provide a modem system having a voice message function for storing voice messages and modifying/revise the voice messages stored to assist the voice message function thereof, thereby facilitating the operation state of the modem to be identified.

Another object of the invention is to provide a modem system having a remote function flag for remotely enabling the voice message function thereof.

SUMMARY OF THE INVENTION

According to the invention, a modem system comprises a modem circuit and a voice message control apparatus, in which the voice message control apparatus includes a modem state detector for detecting the operating states of the modem system; a machine signaling sound mode selector for generating machine signaling sounds corresponding to the operation states of the modem system; a voice message mode selector for generating voice messages corresponding to the operation states of the modem system; a message registering function selector for selecting voice message registering function; a remote function flag for enabling the voice message mode of the modem system remotely; a voice message storage for storing the voice messages; a voice message outputting portion for outputting a voice message stored in the voice message storage; and a controller for enabling the voice message outputting portion to output a voice message according to the operation state of the modem system detected by the modem state detector.

The controller of the modem system further performs the steps of determining whether the message registering function selector is enabled; selecting a kind of a voice message to be registered; inputting a voice message to be registered in a voice message storage; determining whether the message registering is terminated during performing of the selecting of a kind of the voice message and the inputting of a voice message; and outputting the registered voice messages so as to identify the exact registering, if the message registering is terminated.

The controller of the modem system further performs the steps of determining whether the remote function flag is enabled; determining whether the voice message mode is set already; and if the voice message mode is not set, setting the voice message mode so as to output the voice messages.

Also, the controller of the modem system further performs the steps of determining whether the voice message mode or machine signaling mode; outputting machine signaling sounds, if the machine signaling mode is selected; and if the voice message mode is selected, the controller further performs the steps of identifying whether a calling signal is being sent from the modem system(source modem) to the destination modem; outputting a voice message to represent the sending a calling signal to the destination modem; identifying whether a calling signal is being received from a destination modem; outputting a voice message to represent the received calling signal; identifying a response of the destination modem to determine whether the destination modem answers to the call from the source modem; outputting a voice message to represent the response of the destination modem; identifying a communication parameter exchange to determine whether communication parameters are being exchanged between the source and destination modems; outputting a voice message to represent the communication parameter exchange; identifying a communication connection to determine whether the communication data is exchanged between source and destination modems; outputting a voice message to represent the communication data exchange; determining whether the modem connection is terminated after the finishing the communication data exchange; and outputting a voice message to represent the termination of the modem connection.

BRIEF DESCRIPTION OF DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
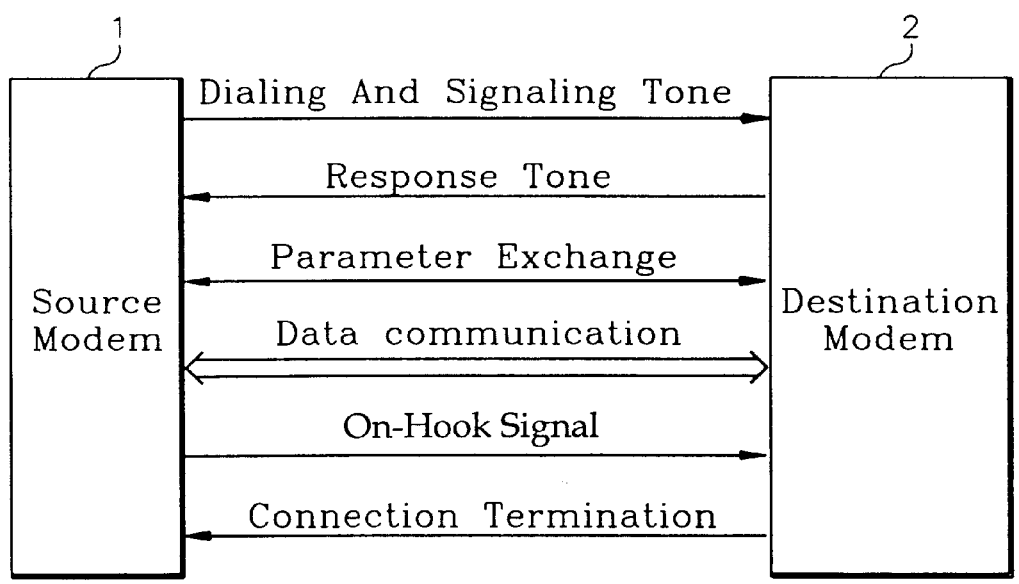
FIG. 1 is a schematic block diagram illustrating a handshaking method of a conventional modem.

Referring to FIG. 1, a hand shake is generally performed as follows: using a computer keyboard, an operator dials a destination modem 2 via a source modem 1 and dialing and signaling tones are transmitted from source modem 1 to destination modem 2. Destination modem 2 sends an answering signal known as a response tone to source modem 1. After source modem 1 receives the response tone from the destination modem 2, communication parameters are exchanged between source modem 1 and destination modem 2. After the exchanging of the communication parameters is finished, data communication is enabled and data is exchanged between source modem 1 and destination modem 2. Upon completion of the data exchange the operator controls source modem 1 to send a disconnect or hang-up signal, i.e., an on-hook signal, to destination modem 2, when the connection is intended to be terminated, to end the modem connection. Then, destination modem 2 sends a connection termination signal to source modem 1, thereby cutting off the connection between them.

Figure 2:
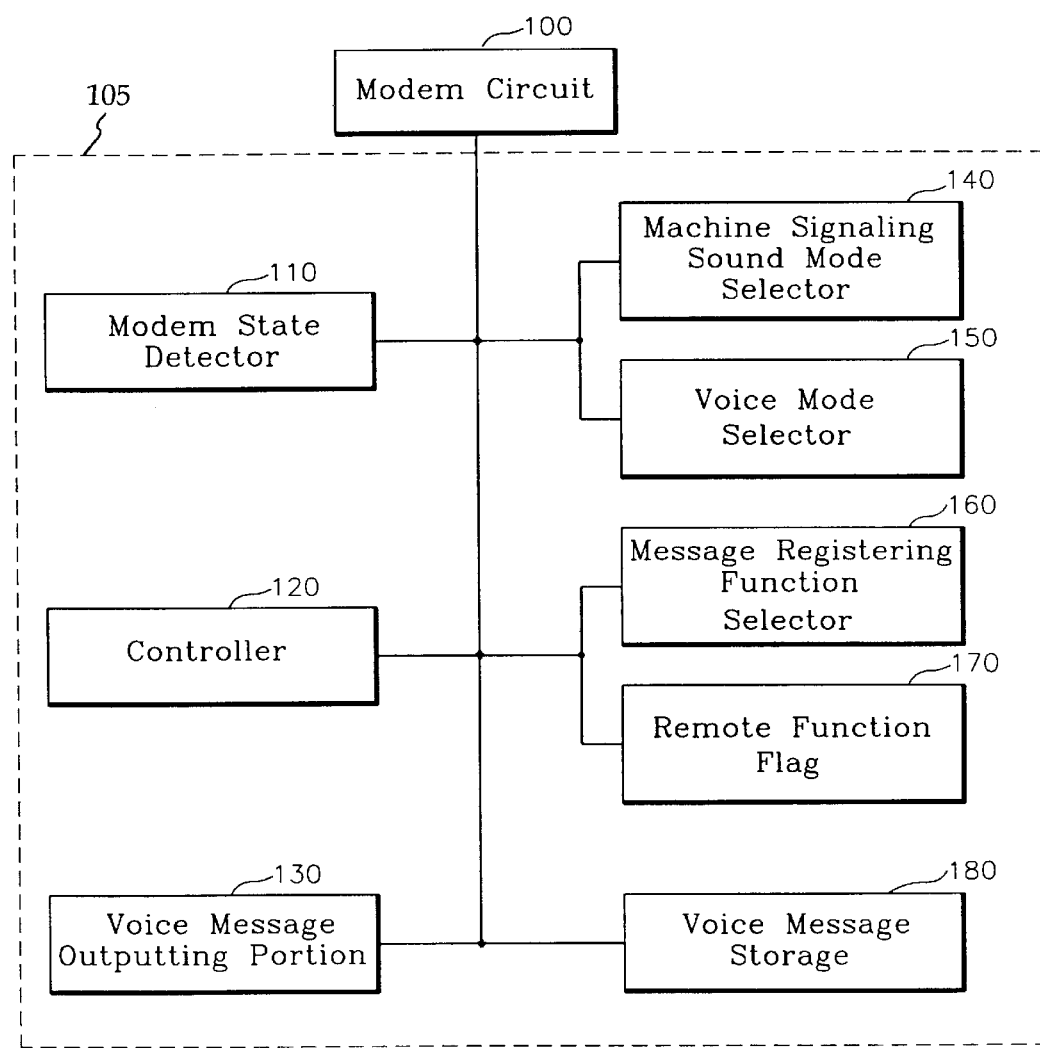
FIG. 2 is a block diagram illustrating a modem system with voice message function in accordance with a preferred embodiment of the invention.

Referring to FIG. 2, a modem system comprises a modem circuit 100 similar to a conventional modem, its detail description being omitted, and a voice message control apparatus 105. Voice message control apparatus 105 includes a modem state detector 110 for detecting the operation state of the modem system; a machine signaling sound mode selector 140 for selecting the generating of machine signaling sounds corresponding to the operation states of the modem system; a voice message mode selector 150 for selecting the generating of voice messages corresponding to the operation states of the modem system; a message registering function selector 160 for selecting a voice message registering function; a remote function flag 170 for remotely setting the voice message mode; a voice message storage 180 for storing the voice messages corresponding to the operation states of the modem system; a voice message outputting portion 130 for outputting a voice message stored in the voice message storage 180; and a controller 120 for enabling the voice message outputting portion 130 to output the voice message according to the operation state of the modem system detected by the modem state detector 110. The voice message outputting portion 130 includes a speaker and its driving circuit, and the mode selectors 140 and 150 and the function selector 160 and 170 may be set on a keyboard of a computer in the form of an inputting key.

As described above, the modem system has a voice message function to output a voice message corresponding to the operation states of the modem system, such as the calling, the parameter exchange, the data exchange and the connection termination between the modem system, i.e., source modem 1, and destination modem 2.

Figure 3:
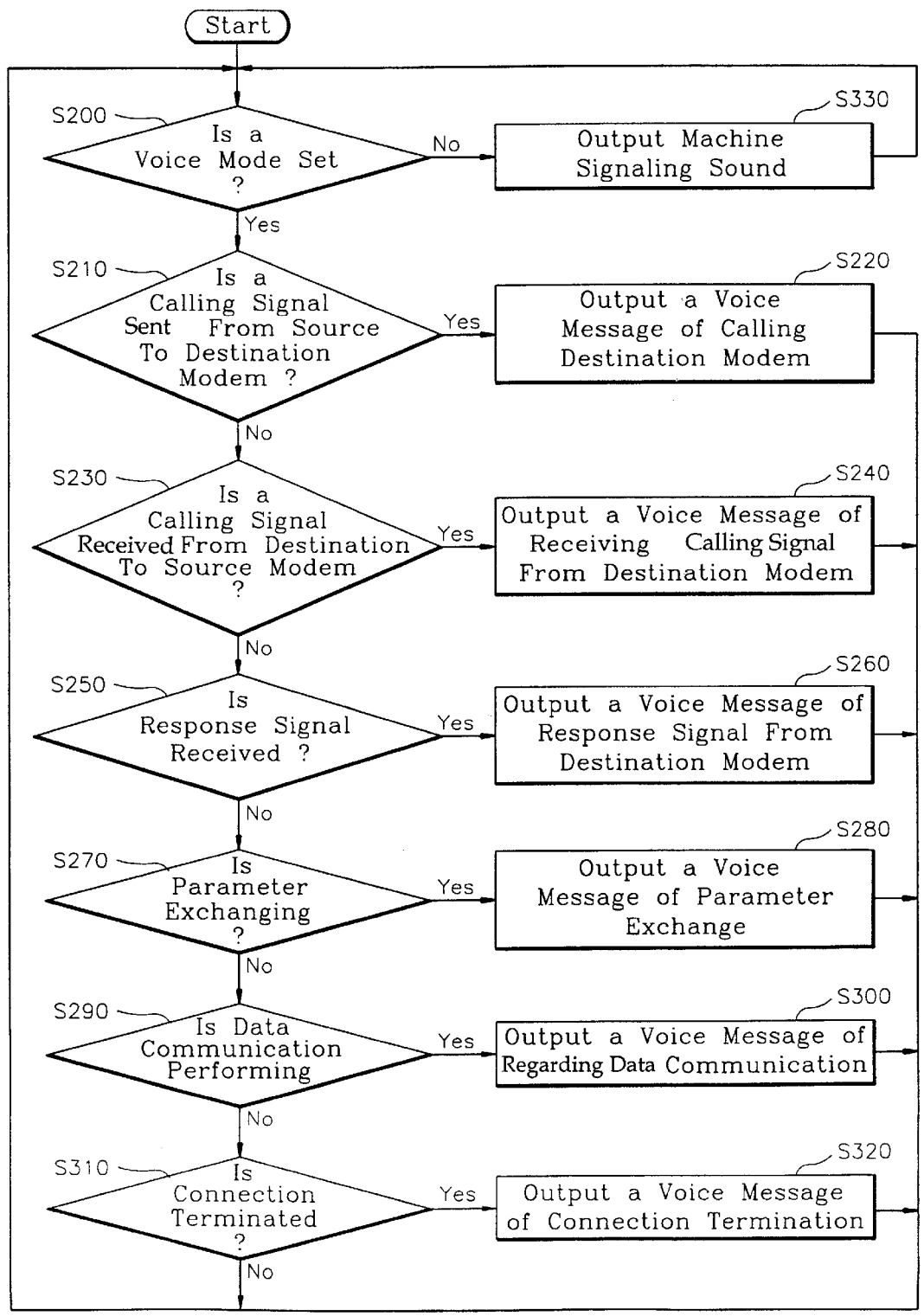
FIG. 3 is a flowchart illustrating the voice message function process of the modem system in accordance with a preferred embodiment of the present invention.

Referring to FIG. 2 and FIG. 3, the modem system performs a voice message function as follows. First, the modem system calls the destination modem by inputting a phone number through a keyboard. At that time, there is determined at step S200 whether a voice mode is set. An indication that the voice mode is not set indicates that a machine signaling sound mode is set. If the machine signaling sound mode is set, step S200 goes on step S330 to output the machine signaling sounds which are the same tones as produced by a conventional modem. If it is determined in step S200 that the voice mode is set, then at step S210 it is determined whether source modem 1 is sending a calling signal to destination modem 2. If it is determined that source modem 1 is sending a calling signal to destination modem 2, then at step S220, a voice message "IT IS NOW CALLING", stored in voice message storage 180 is output through a speaker connected to voice message outputting portion 130. If it is determined that source modem 1 is not sending a calling signal to destination modem 2 at step S220, it is determined at step S230 whether source modem 1 is receiving a calling signal from by another modem (destination modem 2). If it is determined at step 230 that source modem 1 is receiving a calling signal from another modem, then a voice message "IT IS NOW CALLED" stored in the voice message storage 180 through the speaker connected to voice message outputting portion 130 at step S240. If it is determined at step 230 that source modem 1 is receiving a calling signal from another modem, then at step 250 it is determined whether source modem 1 is receiving a response tone from destination modem 2. If a response tone from the destination modem is not received, the calling may be executed again, otherwise the process automatically proceeds from step S250 to step S260 to output a voice message "DESTINATION IS ANSWERING NOW". However, if the response signal from destination modem 2 represents busy state of the destination modem then at step S260 the modem system may output a voice message "DESTINATION LINE IS BUSY".

If the response tone from the destination modem 2 was not received after the calling was executed again in step S250, then at step S270 it is determined whether communication parameters are being exchanged between the source and destination modems. If the communication parameters are being exchanged, then at step S280 a voice message "IT IS NOW EXCHANGING PARAMETERS" is output. After finishing the parameters exchange, that is, when it is determined at step S270 that the parameters are not being exchanged, it is determined at step S290 whether there data communication is being performed. If data communication is being performed, then at step S300 a voice message "IT IS NOW EXCHANGING DATA" is output. After the data exchange is complete, that is, when it is determined that data communication is not being performed at step S290, then it is determined at step S310 whether the modem connection is terminated. If the modem connection is terminated, then at step S320 a voice message "IT IS NOW TERMINATING THE CONNECTION" is output.

Figure 4:
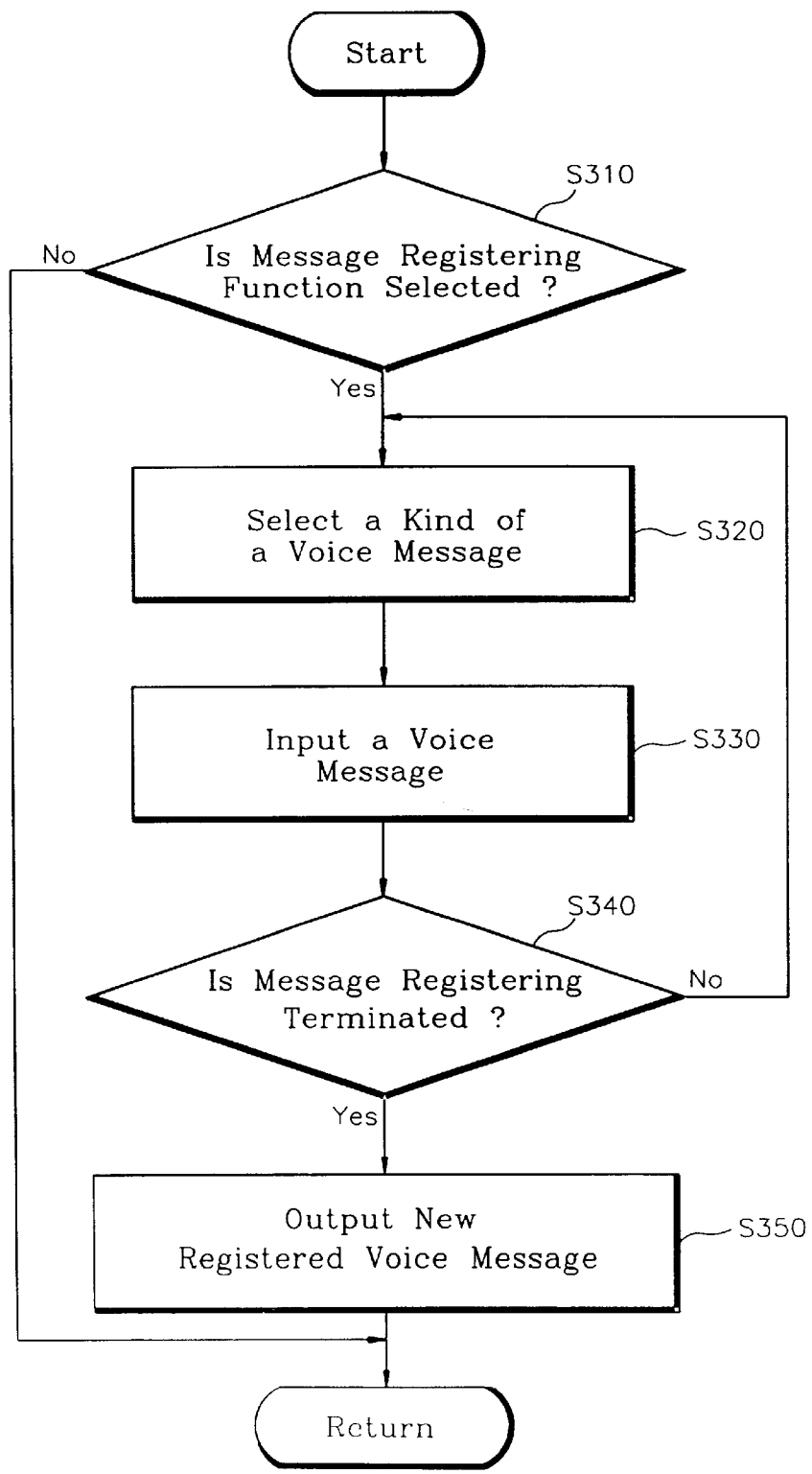
FIG. 4 is a flowchart illustrating the voice message registering process of the modem system in accordance with a preferred embodiment of the present invention.

The above voice messages can be modified or revised using the message registering function selector 160 of voice message control apparatus 105 as will be described with reference to FIG. 4. In step S310 it is determined whether the message registering function is selected. If the message registering function is selected, step S310 goes on step S320 to select a kind of a voice message to be registered. That is, a selection is made regarding which tone signal, i.e., the dialing and signaling tone, the response tone, etc., the voice message will correspond to. Then, at step S330 the voice message to be stored into the voice message storage 180 is input. When it is determined at step S340 that the message registering function is to be terminated, the voice message inputting is determined to be complete. If it is determined at step S340 that the message registering function is not terminated, step S340 jumps to step S320 to select a next kind of a voice message. On the contrary, if the message registering is ended, step S340 goes on step S350 to output the newly registered voice messages so as to identify the exact registering, and then returns to the voice mode.

Figure 5:
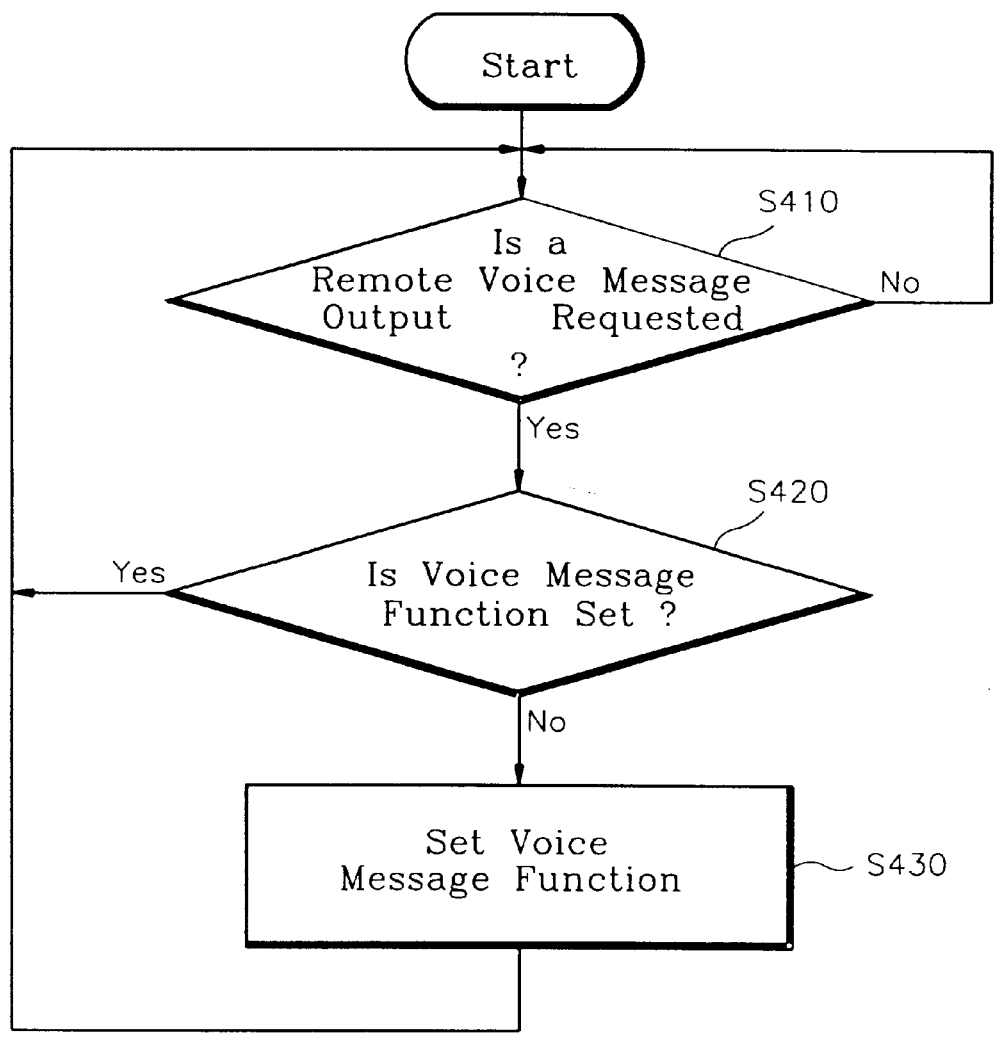
FIG. 5 is a flowchart illustrating a remote function process of the modem system in accordance with a preferred embodiment of the present invention.

Also, as noted above, voice message control apparatus 105 comprises a remote function flag 170 for enabling a voice message mode to be set by a remote modem or remote controller (not shown). Referring to FIG. 5, if the remote function flag is set then at step S410 it is determined whether a remote voice message output is requested from a remote modem or remote controller. If the remote voice message output is requested, step S410 goes on step S420 to determine whether the voice message function is set. If the voice message function is not set, step S420 goes on step S430 to set the voice message mode so as to output voice messages through the speaker connected to voice message outputting portion 130.

As described above, the modem system in accordance with this invention provides with a voice message control apparatus for performing a voice message function, outputting voice messages corresponding to the operating states of the system, and thereby enables the operation states of the system to be easily recognizable to users.

What is claimed is:

1. A modem system comprising:
   a modem; and
   a voice message control apparatus for performing a voice messaging function, said voice message control apparatus comprising:
   means for detecting a current operation state of said modem;
   means for storing a plurality of voice messages corresponding to a plurality of operation states of said modem;
   means for outputting one of said stored voice messages in response to a current operation state detected by said means for detecting a current operation state of said modem;
   means for selecting a machine signaling sound mode to generate machine signaling sounds corresponding to the operation states of said modem;
   means for selecting a voice message mode to generate voice messages corresponding to said operation states of said modem;
   means for selecting message registering function for storing a voice message corresponding to a selected operation state into said means for storing said plurality of voice messages; and
   a remote function flag for enabling said voice message mode to be selected from a remote modem.

2. The modem system as set forth in claim 1, said means for outputting one of said stored voice messages in response to a current operation state detected by said means for detecting a current operation state of said modem comprising:
   a controller responsive to the detected current operation state for generating a control signal; and
   a voice message outputting portion responsive to said control signal for outputting said one of said stored voice messages through a speaker via a speaker driving means.

3. The modem system as set forth in claim 2, wherein said controller controls each of said means for selecting a machine signaling sound mode, said means for selecting a voice message mode, said means for selecting message registering function and said remote function flag in accordance with user activation of various keys on a keyboard.

4. A method for outputting voice messages corresponding to operation states of a modem, said method comprising the steps of:
   determining whether a voice mode is set;
   outputting machine signaling sounds when it is determined that said voice mode is not set;
   detecting a current operation state of said modem when it is determined that said voice mode is set; and
   outputting a voice message corresponding to said current operation state of said modem over a speaker, said steps of detecting a current operation state of said modem and outputting a voice message comprising steps of:
      determining whether connection to a destination modem is terminated and outputting a voice message indicative of connection termination when it is determined that connection to said destination modem is terminated; and
      returning to said step of determining whether a voice mode is set upon determining that said connection to said destination modem is terminated or upon outputting any of said voice messages.

5. The method as set forth in claim 4, said steps of detecting a current operation state of said modem and outputting a voice message comprising steps of:
   determining whether a calling signal is being sent to said destination modem and outputting a voice message corresponding to said calling signal when it is determined that a calling signal is being sent to said destination modem.

6. The method as set forth in claim 4, said steps of detecting a current operation state of said modem and outputting a voice message comprising steps of:
   determining whether a calling signal is being received from another modem and outputting a voice message corresponding to a received calling signal when it is determined that a calling signal is being received from another modem.

7. The method as set forth in claim 4, said steps of detecting a current operation state of said modem and outputting a voice message comprising steps of:

determining whether a response signal is being received from said destination modem and outputting a voice message corresponding to said response signal when it is determined that a response signal is being received from said destination modem.

8. The method as set forth in claim 4, said steps of detecting a current operation state of said modem and outputting a voice message comprising steps of:

determining whether a parameter exchange with said destination modem is occurring and outputting a voice message corresponding to said parameter exchange when it is determined that a parameter exchange with said destination modem is occurring.

9. The method as set forth in claim 4, said steps of detecting a current operation state of said modem and outputting a voice message comprising steps of:

determining whether data communication is being preformed with said destination modem and outputting a voice message corresponding to said data communication being performed when it is determined that said data communication is being preformed with said destination modem.

10. The method as set forth in claim 4, said steps of detecting a current operation state of said modem and outputting a voice message comprising the steps of:

determining whether a calling signal is being sent to said destination modem and outputting a voice message corresponding to said calling signal when it is determined that a calling signal is being sent to a destination modem;

determining whether a calling signal is being received from another modem, upon determining that a calling signal is not being sent to a destination modem, and outputting a voice message corresponding to a received calling signal when it is determined that a calling signal is being received from another modem;

determining whether a response signal is being received from said destination modem, upon determining that a calling signal is not being received from another modem, and outputting a voice message corresponding to said response signal when it is determined that a response signal is being received from said destination modem;

determining whether a parameter exchange with said destination modem is occurring, upon determining that a response signal is not being received from said destination modem, and outputting a voice message corresponding to said parameter exchange when it is determined that a parameter exchange with said destination modem is occurring; and determining whether data communication is being performed with said destination modem, upon determining that a parameter exchange with said destination modem is not occurring, and outputting a voice message corresponding to said data communication being preformed when it is determined that said data communication is being preformed with said destination modem.

11. The method as set forth in claim 4, further comprising the steps of:

determining whether a message registering function, for storing or modifying stored voice messages, is selected;

selecting, upon determination that said message registering function is selected, a kind of voice message is to be registered, said kind of voice message corresponding to any one of said operation states of said modem;

inputting, and registering as a new registered voice message, a voice message corresponding to said selected kind of voice message;

determining whether said message registering function is terminated;

returning to said step of selecting a kind of voice message upon determining that said message registering function is not terminated; and outputting said new registered voice message upon determining that said message registering function is terminated.

12. The method as set forth in claim 4, further comprising the steps of:

determining whether a remote function flag is set;

determining whether a remote voice message output is requested from a remote modem;

determining whether said voice mode is set when it is determined that said remote voice message output is requested; and automatically setting said voice mode when it is determined that said voice mode is not set.

13. A voice message control apparatus for outputting voice messages corresponding to operation states of a modem in a modem system, comprising:

a modem state detector for detecting a current operation state of said modem;

a voice message store for storing a plurality of voice messages corresponding to a plurality of operation states of said modem;

a voice message outputting portion for outputting ones of said stored voice messages through a speaker;

a controller for controlling said voice message outputting portion in response to the current operation state detected by said modem state detector;

a machine signaling sound mode selector for selectively generate machine signaling sounds corresponding to the operation states of said modem;

a voice mode selector for selecting a voice mode to enable voice messages corresponding to said operation states of said modem to be generated;

a message registering function selector for enabling storage of voice messages corresponding said operation states; and a remote function flag for enabling said voice mode to be selected from a remote modem.

14. The voice message control apparatus as set forth in claim 13, wherein said controller controls said machine signaling sound mode selector, said a voice mode selector, said message registering function selector and said remote function flag in accordance with user activation of various keys on a keyboard.

15. The voice message control apparatus as set forth in claim 13, wherein said controller checks said voice mode selector to determine whether a voice mode is set, controls said machine signaling sound selector to generate machine signaling sounds when it is determined that said voice mode is not set, checks said modem state detector to determine the current operation state of said modem when it is determined that said voice mode is set and controls said voice message outputting portion in response to the current operation state detected by said modem state detector.

* * * * *